United States Patent
Rozenberg et al.

(10) Patent No.: US 11,619,953 B2
(45) Date of Patent: Apr. 4, 2023

(54) THREE DIMENSIONAL AIRCRAFT AUTONOMOUS NAVIGATION UNDER CONSTRAINTS

(71) Applicant: ISRAEL AEROSPACE INDUSTRIES LTD., Lod (IL)

(72) Inventors: Ohad Rozenberg, Yad Binyamin (IL); Erez Avrahamov, Peduel (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 121 days.

(21) Appl. No.: 16/892,729

(22) Filed: Jun. 4, 2020

(65) Prior Publication Data
US 2020/0393852 A1    Dec. 17, 2020

(30) Foreign Application Priority Data
Jun. 12, 2019    (IL) .......................................... 267356

(51) Int. Cl.
| | |
|---|---|
| *G05D 1/10* | (2006.01) |
| *B64C 39/02* | (2006.01) |
| *G08G 5/00* | (2006.01) |
| *G08G 5/02* | (2006.01) |

(52) U.S. Cl.
CPC ........... *G05D 1/106* (2019.05); *B64C 39/024* (2013.01); *G08G 5/006* (2013.01); *G08G 5/0039* (2013.01); *G08G 5/0069* (2013.01); *G08G 5/02* (2013.01); *B64U 2201/10* (2023.01)

(58) Field of Classification Search
CPC ...................................................... G05D 1/106
See application file for complete search history.

(56) References Cited

U.S. PATENT DOCUMENTS

| | | |
|---|---|---|
| 9,257,048 B1 | 2/2016 | Offer et al. |
| 11,230,377 B2 * | 1/2022 | Srivastava ........... G05D 1/1064 |
| 2009/0210109 A1 | 8/2009 | Ravenscroft |
| 2013/0327014 A1 * | 12/2013 | Moulebhar ............. F02K 3/065 |
| | | 60/226.2 |

(Continued)

FOREIGN PATENT DOCUMENTS

| | | | |
|---|---|---|---|
| EP | 3251108 A1 * | 12/2017 | ........... B64C 39/024 |
| EP | 3470786 A1 | 4/2019 | |
| WO | 2017145398 A1 | 8/2017 | |

OTHER PUBLICATIONS

NPL, Lui, Yecheng et al., A virtual-waypoint based artificial potential field method for UAV path planning, 2016 IEEE Chinese Guidance, Navigation and Control Conference (CGNCC)( https://ieeexplore.ieee.org/abstract/document/7828913) (hereinafter "Yecheng").*

(Continued)

*Primary Examiner* — Jean Paul Cass
(74) *Attorney, Agent, or Firm* — Dorsey & Whitney LLP

(57) ABSTRACT

According to the presently discloses subject matter, a flight path is autonomously generated (e.g. in response to an unexpected need to land the aircraft) leading the aircraft from its current position towards a target destination (e.g. a landing site) where the flight path is generated while taking into consideration flight constraints existing in the area and avoiding violation of the flight constraints. The flight path is then used for autonomous generation of flight instructions for controlling the aircraft and leading the aircraft to the desired destination.

14 Claims, 7 Drawing Sheets

(56) References Cited

U.S. PATENT DOCUMENTS

| | | | | |
|---|---|---|---|---|
| 2017/0106986 | A1* | 4/2017 | Sweeny | B64D 17/70 |
| 2017/0358212 | A1* | 12/2017 | Godwin | G05D 1/106 |
| 2019/0054937 | A1* | 2/2019 | Graetz | B61L 23/048 |
| 2020/0160734 | A1* | 5/2020 | Priest | G08G 5/0039 |
| 2020/0364930 | A1* | 11/2020 | Buys | G06V 10/82 |
| 2021/0089055 | A1* | 3/2021 | Tran | G08G 5/0078 |
| 2021/0116942 | A1* | 4/2021 | Gandiga | B60P 3/11 |
| 2021/0197968 | A1* | 7/2021 | Kwak | B64C 27/52 |
| 2021/0365052 | A1* | 11/2021 | Burdick | G08G 5/006 |
| 2022/0026929 | A1* | 1/2022 | Foster | G01V 99/005 |

OTHER PUBLICATIONS

Google Machine Translation of International Patent Pub. No. WO2017145398A1 ()US 10890928B2 to Soma) (May 30, 2016) (Year: 2016).*

Ayhan, Bulent et al., "Preflight Contingency Planning Approach for Fixed Wing UAVs With Engine Failure in the Presence of Winds". Sensors, 19.2, Jan. 2019, 227.

* cited by examiner

THREE DIMENSIONAL AIRCRAFT AUTONOMOUS NAVIGATION UNDER CONSTRAINTS

FIELD OF THE PRESENTLY DISCLOSED SUBJECT MATTER

The presently disclosed subject matter relates to the field of autonomously controlled aircrafts.

BACKGROUND

When operating in autonomous flight mode, an aircraft autonomously determines its own flight path to a desired destination.

GENERAL DESCRIPTION

For the purpose of the present description and by way of example only, an orthogonal X-Y-Z coordinate ("axis") system is used where the X and Y axis are aligned with the horizontal plane and the Z axis represents a direction (up and down) along a vertical line orthogonal to the horizontal plane.

In different flight scenarios the flight path of the aircraft is restricted by various constraints. Flight constraints can be divided into different types, including two dimensional (2D) constraints and three dimensional (3D) constraints. The first type (2D) includes constraints that restrict flight in one or more specific directions in the aircraft's horizontal plane (along the x and y directions), independent of the altitude of the aircraft (along the z direction). The second type (3D) includes constraints that restrict the flight of the aircraft at a specific altitude or altitude range (along the z direction). Notably, 2D constraints can be considered as a sub-category of 3D constraints, where the restricted altitudes range includes all attitudes (along the z direction).

Examples of 2D constraints include:
- no-flight zones (NFZ)-areas over which aircrafts (such as UAVs) are not permitted to fly. For example, for national security reasons, aircrafts may be prohibited to cross a border separating between neighboring countries.
- Human safety-aircrafts (such as UAVs) may not be permitted to fly over populated areas for human safety reasons.
- Air traffic control-aircrafts (such as UAVs) may not be allowed to fly over certain areas due to air traffic control regulation. For example, aircrafts may not be permitted to enter an airport area.

Examples of 3D constraints include:
- Air traffic control-aircrafts (such as UAVs) may not be permitted to fly at a certain altitude range. One example, is an airway that defines a corridor that connects one specific location to another a specific altitude. The UAV may not be allowed to fly at a specific altitude range where the airway (or airways) is locate, but may be allowed to fly at an altitude which is higher or lower than the specific altitude range.
- Technical restrictions—certain aircrafts may not be allowed to fly higher than a certain maximal altitude or lower than a certain minimal altitude. For example, this may be due to technical limitations of the aircraft, which may be incapable of exceeding a certain altitude, or due to limitation of the communicating channel the UAV is using.
- Human safety—for example, aircrafts (such as UAVs) may not be allowed to fly over populated areas at an altitude which is lower than a certain threshold but may be allowed to fly at higher altitudes. This may be in order to avoid collision with buildings and other structures.

Other flight constrains are related to topography. For example, flight paths can be restricted in the vicinity of mountains to avoid the risk of collision.

Information pertaining to existing flight constraints is referred herein in general as "flight constraints data" and can include for example, the location of the restricted area, the size and/or boundaries of the restricted area (e.g. along x and y directions), the restricted altitude ranges (along the z direction), and possibly the type of constraint. Flight constraints data may not be available at the time the flight path is being planned before takeoff. This can result, for example, from lack of intelligence, or from changes in real-time conditions which occur during flight, and therefore are not predictable during flight path planning. This is the case for example, in unexpected landing situations, where an aircraft is forced to land unexpectedly and divert from its originally planned fight path.

One cause for unexpected (or forced) landing may be a technical failure. Such technical failure may include for example any one of: engine failure, sudden battery depletion (e.g. as a result of alternator failure), fuel deficiency (e.g. due to a leak), etc. In such cases, it is imperative to enable safe landing of the aircraft in order to avoid endangerment of civilians and property on the ground, passengers and cargo on the plane, the plain itself, as well as damage to the surroundings of the landing area.

In other cases unexpected landing can occur when the UAV is mechanically intact. For example, when unexpected landing is required for operational reasons, e.g. for providing cargo at an unexpected site.

Notably, in some cases the need for unexpected landing arises while communication with the control station is unavailable, and in such cases a human operator cannot intervene and assist in the navigation and landing procedure. Therefore, the need for autonomous control, for leading the aircraft to a landing site and safely landing the aircraft, is crucial.

The presently disclosed subject matter includes a computerized method and system that provide autonomous control over an aircraft during flight while considering constraints in the flight area. According to more specific examples, the disclosed method and system provide autonomous control over an aircraft during flight while considering constraints in an unexpected landing scenario.

According to the presently discloses subject matter, a flight path is autonomously generated (e.g. in response to an unexpected need to land the aircraft) leading the aircraft from its current position towards a target destination (e.g. a landing site) where the flight path is generated while taking into consideration flight constraints existing in the area and avoiding violation of the flight constraints. The flight path is then used for autonomous generation of flight instructions for controlling the aircraft and leading the aircraft to the desired destination.

According to an aspect of the presently disclosed subject matter there is provided a method of autonomous generation of flight path, the method comprising, with the help of a processing circuity comprising at least one computer processor, performing at least the following operations:

while the aircraft is flying in midair, in response to data indicative of a need to autonomously navigate the aircraft, calculating a flight path from a current position of the aircraft to a target position of the aircraft, in some examples the calculation comprising:

determining an initial flight path leading from a current position to the target position;

processing of the initial flight path, the processing comprising:

A. determining whether there is one or more restricted areas located along the flight path;
for each of at least some of the restricted areas:
calculating a predicted altitude range of the aircraft when traversing the restricted area;
determining whether there is a conflict between an altitude restriction characterizing the restricted area and the predicted altitude range;
and should such conflict exist,
determining one or more alternative sections circumventing the restricted area; each alternative section together with one or more previous sections leading to it, represent a candidate flight path;
repeating process (A) for each candidate flight path;
selecting a preferred flight path from among the candidate flight paths; and
generating instructions to aerial control devices for guiding the aircraft along the selected flight path.

In addition to the above features, the method according to this aspect of the presently disclosed subject matter can optionally comprise one or more of features (i) to (xi) below, in any desired combination or permutation:

i. The method further comprising:
determining whether the entire airspace in the restricted area is prohibited for flight, and if so, determining one or more horizontal alternative sections circumventing the restricted area.

ii. The method, wherein the one or more alternative sections comprise one or more alternative vertical sections for circumventing the restricted area from above or below.

iii. The method, wherein the one or more alternative sections comprise one or more alternative horizontal sections for circumventing the restricted area from one or both sides.

iv. The method, wherein restricted areas are characterized by any one of: 2D flight constraints; 3D flight constraints; and topographical flight constraints.

v. The method, wherein process (A) further comprises:
assigning a respective weight to each one of the one or more alternative sections; the respective weight representing one or more cost parameters;
selecting a preferred flight path, the preferred flight path comprising one or more alternative sections and is characterized by an acceptable overall cost value calculated based on the respective weights assigned to the one or more alternative sections.

vi. The method, wherein calculating the predicted altitude range when traversing the restricted area is based on a glide ratio of the aircraft.

vii. The method, wherein the target position is a landing window.

viii. The method, wherein the aircraft is a UAV.

ix. The method, wherein the data indicative of a need to autonomously navigate the aircraft includes data indicative of a need to unexpectedly land the aircraft; the method further comprising:
determining a landing site, wherein the target position is located near the landing site.

x. The method further comprising:
identifying at least two potential landing sites;
determining two or more initial flight paths, each leading from a current position of the aircraft to a target position determined according to a respective landing site;
performing process (A) for each initial flight path to thereby obtain a plurality of preferred flight paths, each leading to a respective landing site;
selecting a final flight path and a respective landing site from among the plurality of preferred flight paths.

xi. The method, wherein process (A) further comprises:
determining whether any of the candidate flight paths intersects a topographical constraint; wherein the traversed area is divided into cells, each cell being classified as traversable or non-traversable, and wherein a cell that comprises topography that obstructs flight of the aircraft is classified as non-traversable;
for each non-traversable cell along a candidate flight path, determining one or more alternative sections circumventing the non-traversable cell; each alternative section, when incorporated in the candidate flight path, represents an additional candidate flight path;
repeating process (A) for each candidate flight path;
selecting the preferred flight path from among the candidate flight paths (if they exist) and the additional candidate flight paths; and
generating instructions to aerial control devices for guiding the aircraft along the selected flight path.

According to another aspect of the presently disclosed subject matter there is provided a system mountable on an aircraft for autonomously controlling the aircraft; the system comprising a processing circuitry configured to:

in response to data indicative of a need to autonomously navigate the aircraft, calculate a flight path from a current position of the aircraft to a target position of the aircraft, in some examples the calculation comprising:

determining an initial flight path leading from a current position to the target position;

processing of the initial flight path, the processing comprising:

A. determining whether there is one or more restricted areas located along the flight path;
for each restricted area:
calculating a predicted altitude range of the aircraft when traversing the restricted area;
determining whether there is a conflict between an altitude restriction characterizing the restricted area and the predicted altitude range;
and should there be such a conflict,
determining one or more alternative sections circumventing the restricted area; each alternative section together with one or more previous sections leading to the alternative section, represent a candidate flight path;
repeating process (A) for each candidate flight path;
selecting a preferred flight path from among the candidate flight paths; and
generating instructions to aerial control devices for guiding the aircraft along the selected flight path.

The presently disclosed subject matter further contemplates a UAV configured with the system as disclosed herein above.

According to another aspect of the presently disclosed subject matter there is provided a computer-readable (e.g. non-transitory) memory device tangibly embodying a program of instructions executable by the computer for executing a method of autonomous generation of a flight path while traversing an area, the method comprising:

while the aircraft is flying in midair, in response to data indicative of a need to autonomously navigate the aircraft, calculating a flight path from a current position of the aircraft to a target position of the aircraft, in some examples the calculation comprising:

determining an initial flight path leading from a current position to the target position;

processing of the initial flight path, the processing comprising:

A. determining whether there is one or more restricted areas located along the flight path;

for each restricted area:

calculating a predicted altitude range of the aircraft when traversing the restricted area;

determining whether there is a conflict between an altitude restriction characterizing the restricted area and the predicted altitude range;

and should such a conflict exist, determining one or more alternative sections circumventing the restricted area; each alternative section together with one or more previous sections leading to the alternative section, represent a candidate flight path;

repeating process (A) for each candidate flight path;

selecting a preferred flight path from among the candidate flight paths; and generating instructions to aerial control devices for guiding the aircraft along the selected flight path.

The system, the memory device and UAV disclosed in accordance with the presently disclosed subject matter can optionally comprise one or more of features (i) to (xi) listed above with respect to the method, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
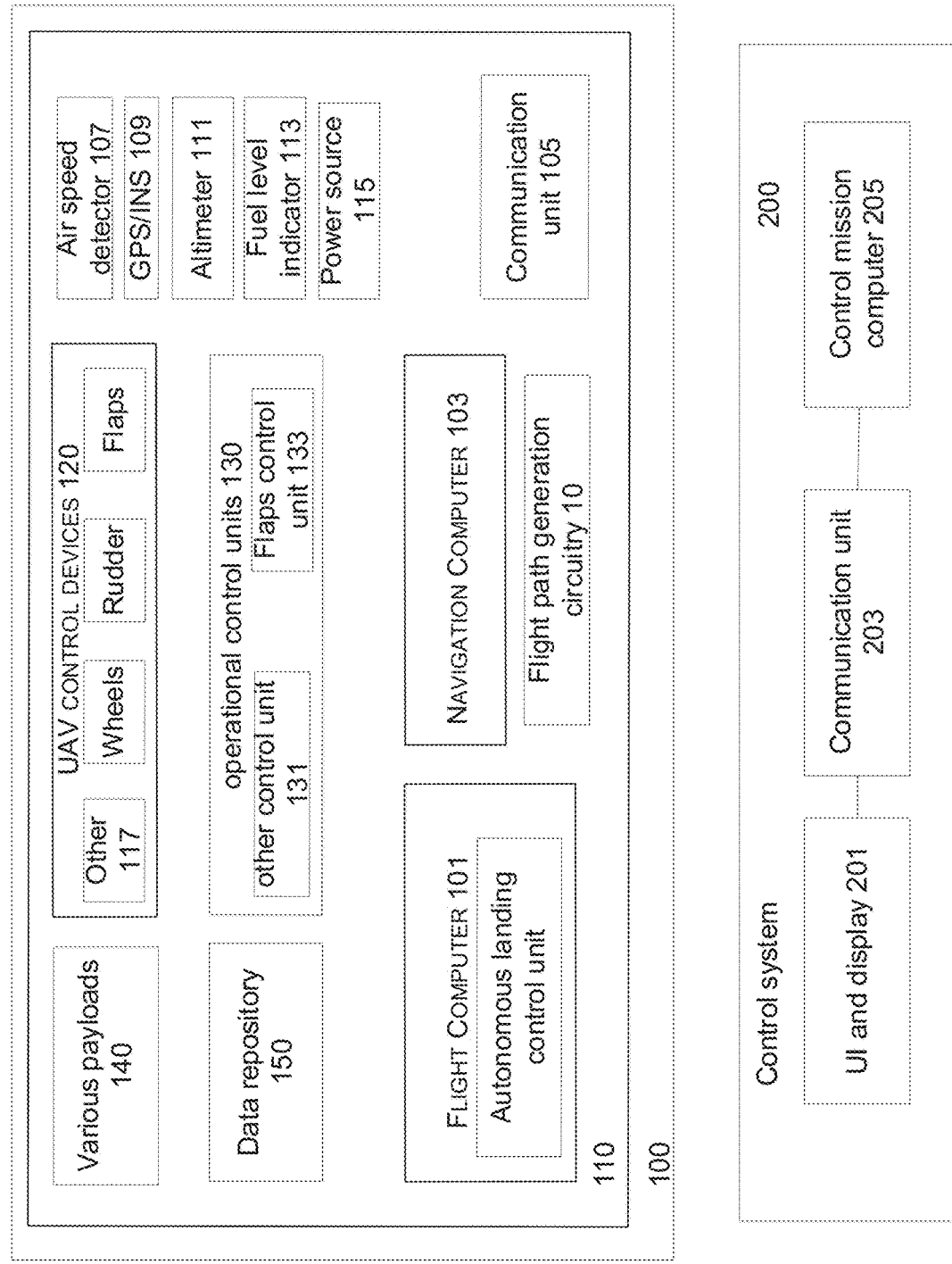
FIG. 1 is a block diagram schematically illustrating an autonomous control system, according to some examples of the presently disclosed subject matter.

In the drawings and descriptions set forth, identical reference numerals may indicate components that are common to different embodiments or configurations. Elements in the drawings are not necessarily drawn to scale.

Unless specifically stated otherwise, as apparent from the following discussions, it is appreciated that throughout the specification discussions utilizing terms such as "determining", "calculating", "selecting", "generating" or the like, include actions and/or processes of a computer that manipulate and/or transform data into other data, said data represented as physical quantities, e.g. such as electronic quantities, and/or said data representing the physical objects.

The terms "computer", "computer system" (or "system") "computer subsystem" (or "subsystem"), "computer/computerized device", "control unit", or the like as disclosed herein should be broadly construed to include any kind of hardware electronic device with data processing circuitry, which includes a computer processing device configured and operable to execute computer instructions stored, for example, on a computer memory being operatively connected thereto. Examples of such a device include: a digital signal processor (DSP), a microcontroller, a field programmable gate array (FPGA), an application specific integrated circuit (ASIC), or a device such as a laptop computer, a personal computer, a smartphone, etc.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Figure 2:
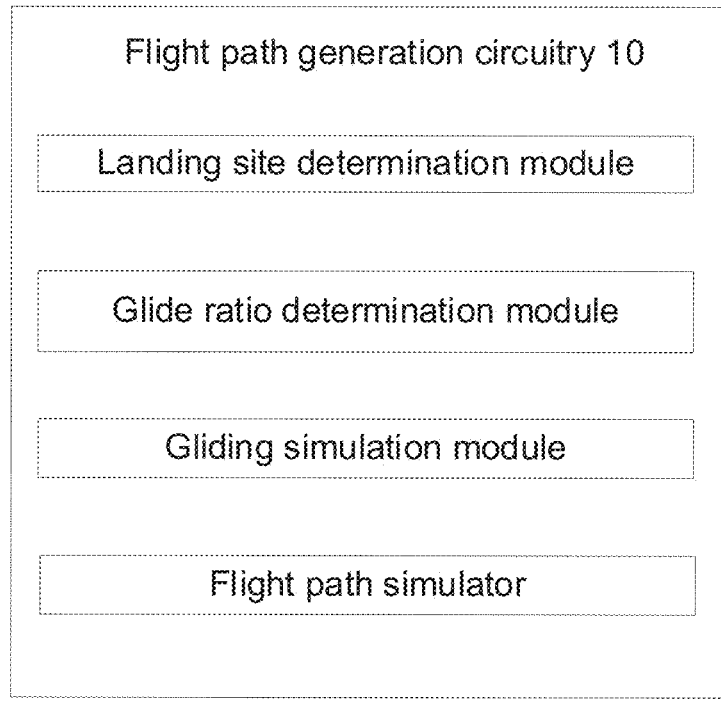
FIG. 2 is a block diagram schematically illustrating a flight path generation circuitry, according to some examples of the presently disclosed subject matter.
Figure 3:
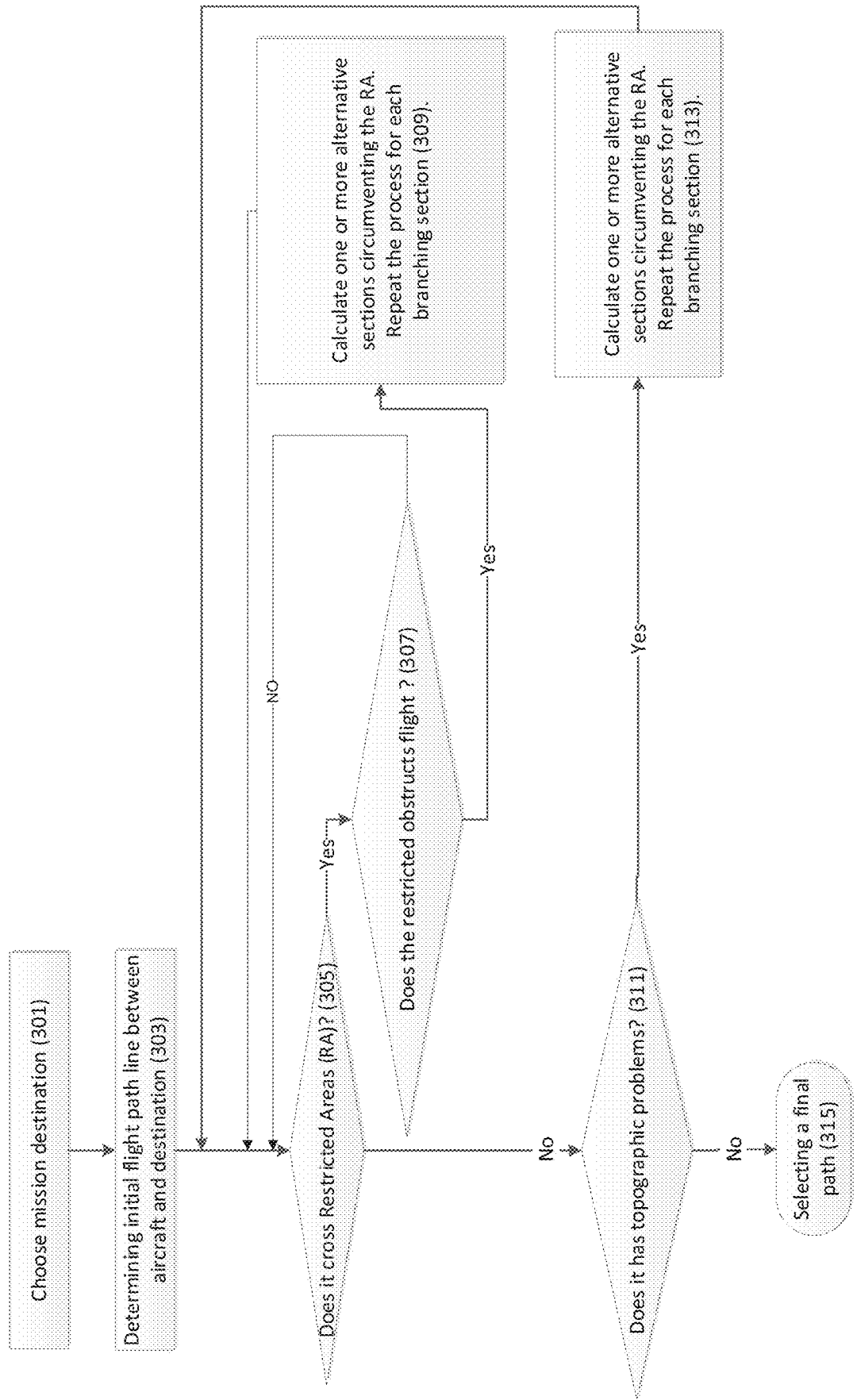
FIG. 3 is a flowchart showing a sequence of operations which are carried out for autonomously generating a flight path, according to some examples of the presently disclosed subject matter.
Figure 4:
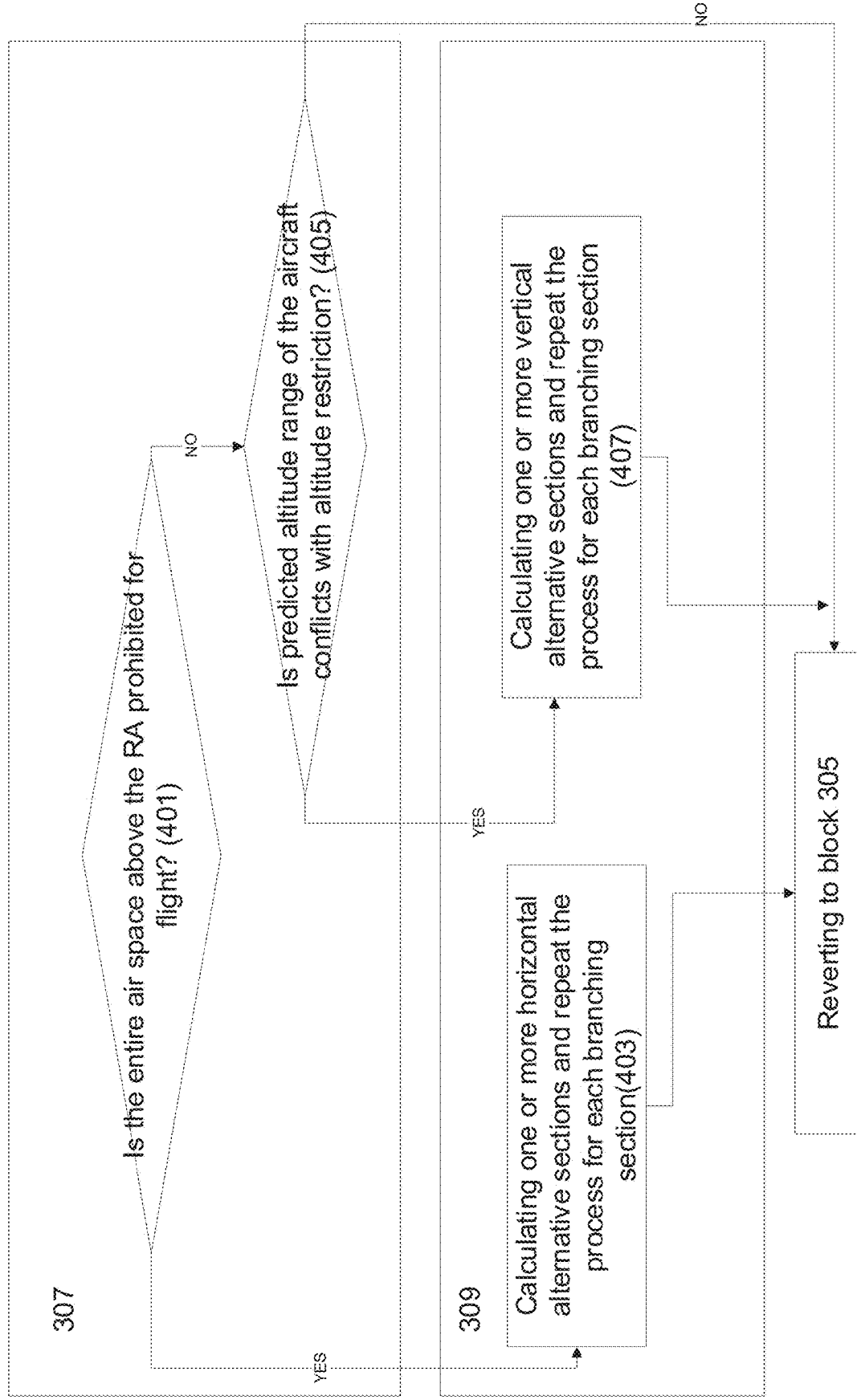
FIG. 4 is a flowchart showing further details of some operations from FIG. 3, according to some examples of the presently disclosed subject matter.

In embodiments of the presently disclosed subject matter, fewer, more and/or different stages than those shown in FIGS. 3 and 4 may be executed. In embodiments of the presently disclosed subject matter, one or more stages illustrated FIGS. 3 and 4 may be executed in a different order and/or one or more groups of stages may be executed simultaneously. FIGS. 1 and 2 illustrate a general schematic of the system architecture in accordance with an embodiment of the presently disclosed subject matter. It is noted that the teachings of the presently disclosed subject matter are not bound by the system described with reference to FIGS. 1 and 2. Equivalent and/or modified functionality can be consolidated or divided in another manner and can be implemented in any appropriate combination of software with firmware and/or hardware and executed on a suitable device. Functional elements in FIGS. 1 and 2 may be centralized in one location or dispersed over more than one location. In other embodiments of the presently disclosed subject matter, the system may comprise fewer, more, and/or different (e.g. distributed differently) functional elements than those shown in FIGS. 1 and 2.

The term "substantially" is used herein to imply the possibility of variations in values within an acceptable range. In some examples, the term "substantially" implies a 10% variation over or under a specific value or state, in some examples, the term "substantially" implies a 5% variation over or under a specific value or state, and in some examples, the term "substantially" implies a 2.5% variation over or under a specific value or state. For example, the phrase "substantially straight line" is used to imply that the line may not be completely straight from edge to edge and may have e.g. some curved areas.

While the following description refers in some places to a UAV, this is done by way of example only and should not be construed as limiting. The same principles can be similarly applied to a piloted aircraft capable of operating in autonomous mode.

Attention is now drawn to FIG. 1 which shows an autonomous control system according to some examples of the presently disclosed subject matter. System 110 can be suitably mounted on an aircraft 100 such as a UAV and comprises various devices and subsystems. In some examples, system 110 comprises a flight computer 101 operatively connected to a navigation computer 103. The flight computer is configured to control and manage the operations of various sub-systems and devices on-board the UAV during a mission. For example, flight computer 101 can control sub-systems related to takeoff and landing, navigation, payload activation, etc.

According to some examples, navigation computer 103 is configured to generate navigation instructions for leading the UAV from a current position to a desired target position. The navigation computer 103 is operatively connected to aircraft positioning and sensing utilities such as air speed detector 107 (e.g. pitot tube), GPS receiver 109, inertial navigation system (INS) 109, altimeter 111 (e.g. pressure altimeter, sonic altimeter, radar altimeter, GPS based altimeter, etc.), etc. These devices are used for determining aircraft situation data including: current position and attitude (six degree of freedom), heading, and speed of the aircraft. Based on the aircraft situation data and the desired destination, the navigation computer can generate data that is used by the flight computer 101 for controlling various aerial control devices 120 for the purpose of controlling the UAV fight, e.g. along a flight path (defined for example by a series of waypoints (WPs)) leading to the destination. In some cases the flight path is predefined or generated by another entity communicating with the UAV (e.g. remote control unit 200), while in other cases the flight path is generated by the UAV (e.g. by onboard navigation computer 103) while flying.

Aerial control devices 120 include for example, elevators, ailerons, flaps, rudder, throttle, wheels and others. Elevators enable the plane to go up and down through the air. The elevators change the horizontal stabilizer's angle of attack, and the resulting lift either raises the rear of the aircraft (pointing the nose down) or lowers it (pointing the nose skyward). Ailerons are horizontal flaps located near the end of an airplane's wings. Ailerons allow one wing to generate more lift than the other, resulting in a rolling motion that allows the plane to bank left or right. A rudder is a flap located on the vertical tail wing. The rudder enables the plane to turn left or right. Throttle enables to increase/decrease thrust. Wheels may be used during landing.

According to some examples, system 110 comprises various operational control units 130 operatively connected to flight computer 101. The control units interface between the flight computer and the flight control devices and provide specific instructions for controlling respective UAV control devices in response to instructions received from the flight computer.

FIG. 1 further schematically illustrates a control unit 200 located remotely from the UAV (e.g. on the ground) and configured and operable to control and monitor the UAV. Communication between the control unit and the UAV can be via a line of site or beyond the line of site communication link. The control unit enables and operator to control and monitor the aircraft operation during operation. In some examples, imaging data captured by imaging payloads (140) onboard the UVA are transmitted to the control unit, where the data is displayed to be viewed by operators.

According to some examples of the presently disclosed subject matter, system 110 is configured and operable to autonomously generate a flight path (also sometimes referred to herein as an "emergency flight path") leading the aircraft from its current position to a desired destination. For example, autonomous generation of a flight path may be initiated by system 110 in response to received data indicative of a need for an unexpected landing, where a flight path leading the UAV from its current position to a landing site is generated.

To this end, in some examples system 110 comprises a subsystem (referred to here also as "flight path generation circuitry 10") dedicated for generating an emergency flight path. In some examples, this subsystem is implemented as part of navigation computer 103 but this is not always necessary and it can be implemented as part of another subsystem or as a separate subsystem. In further examples, various operations executed by flight path generation circuitry 10 can be distributed across different subsystems in system 110.

FIG. 2 is a schematic illustration of flight path generation circuitry 10, according to some examples of the presently disclosed subject matter.

Flight path generation circuitry 10 can comprise or be otherwise operatively connected to a processing circuitry that includes one or more computer processors. The processing circuitry can be configured to execute several functional modules in accordance with computer-readable instructions implemented on a non-transitory computer-readable storage medium. Such functional modules are referred to hereinafter as comprised in the processing circuitry. In some examples flight path generation circuitry 10 includes the following modules:

Landing site determination module is configured to select a preferred landing site as explained below with reference to block 301 in FIG. 1.

Glide ratio determination module is configured to repeatedly calculate the glide ratio for the benefit of subsystems that make use of this information. In some examples, glide ratio can be calculated based on at least groundspeed data (e.g. from GPS 109) and altitude data (e.g. from altimeter 111).

In some examples, flight path generation circuitry 10 further comprises a gliding predictor module configured and operable to estimate the altitude of the UAV along the flight path. Gliding predictor module uses the glide ratio provided by the glide ratio determination module.

Flight path generation circuitry 10 can also comprise a flight path calculator unit configured to actually generate an flight path as further discussed with reference to FIG. 3 below.

Figure 5A:
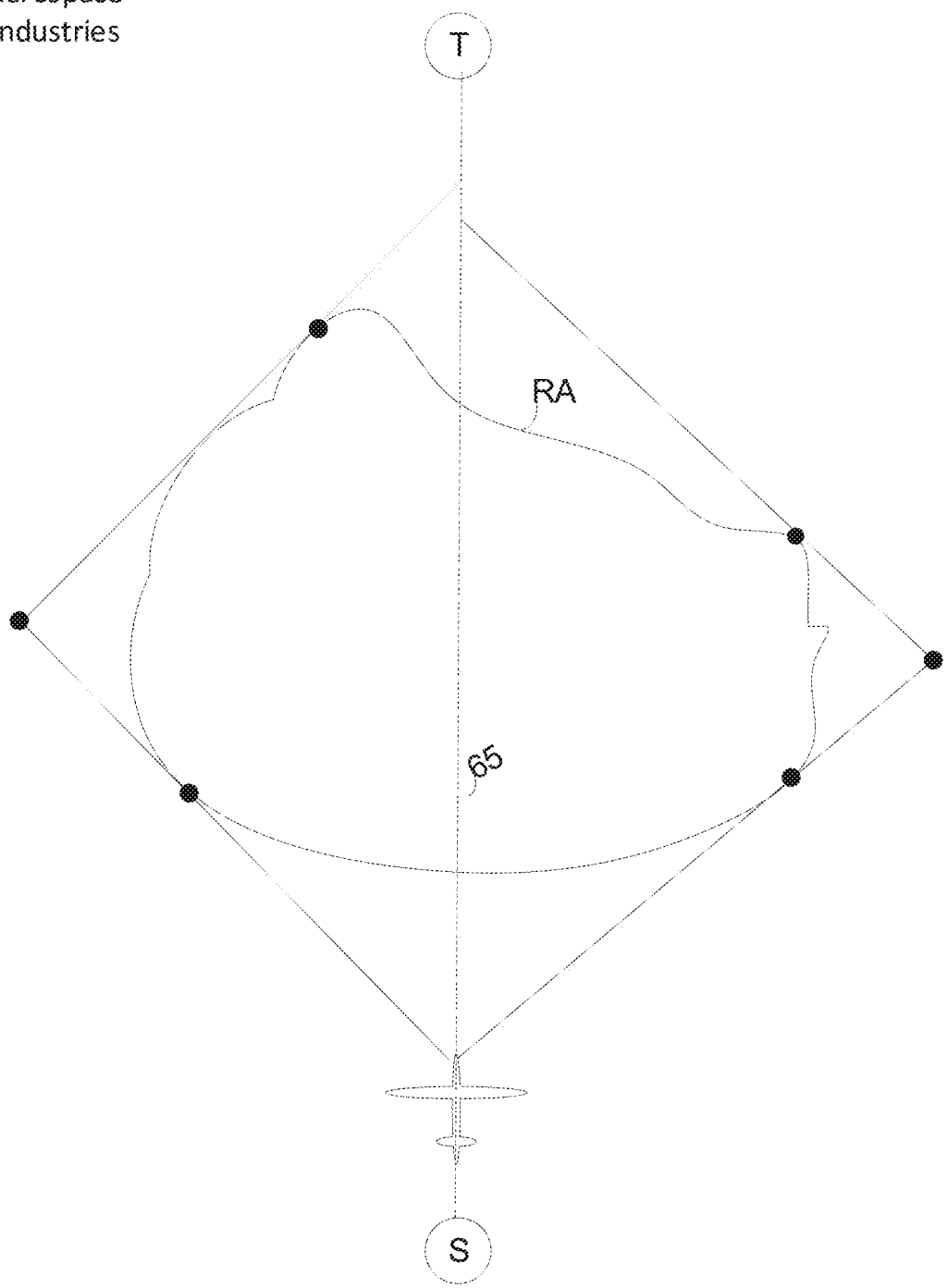
FIG. 5a is a schematic illustration of a flight path generation demonstrating some principles according to examples of the presently disclosed subject matter.
Figure 5B:
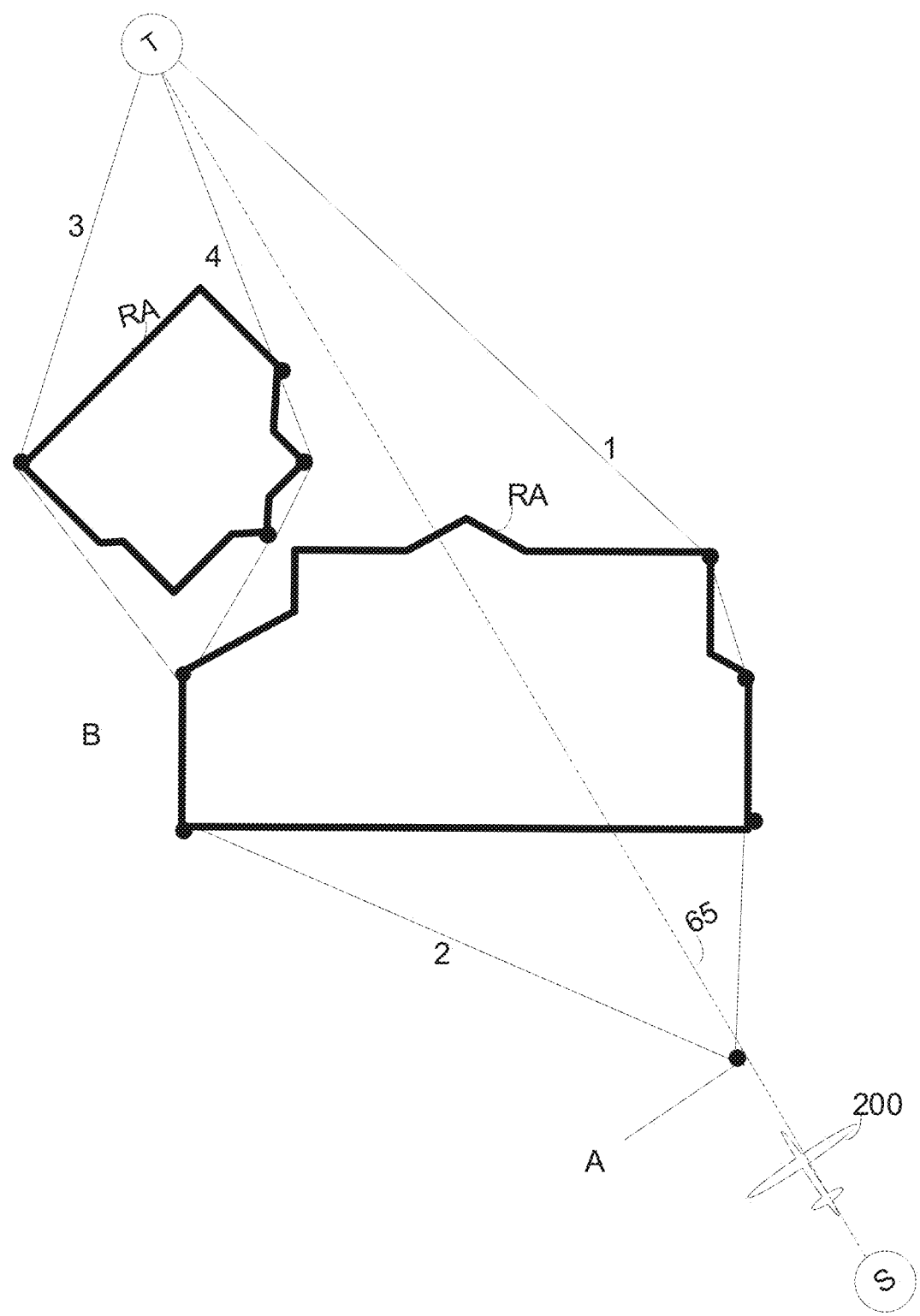
FIG. 5b is another schematic illustration of a flight path generation demonstrating some principles according to examples of the presently disclosed subject matter.
Figure 5C:
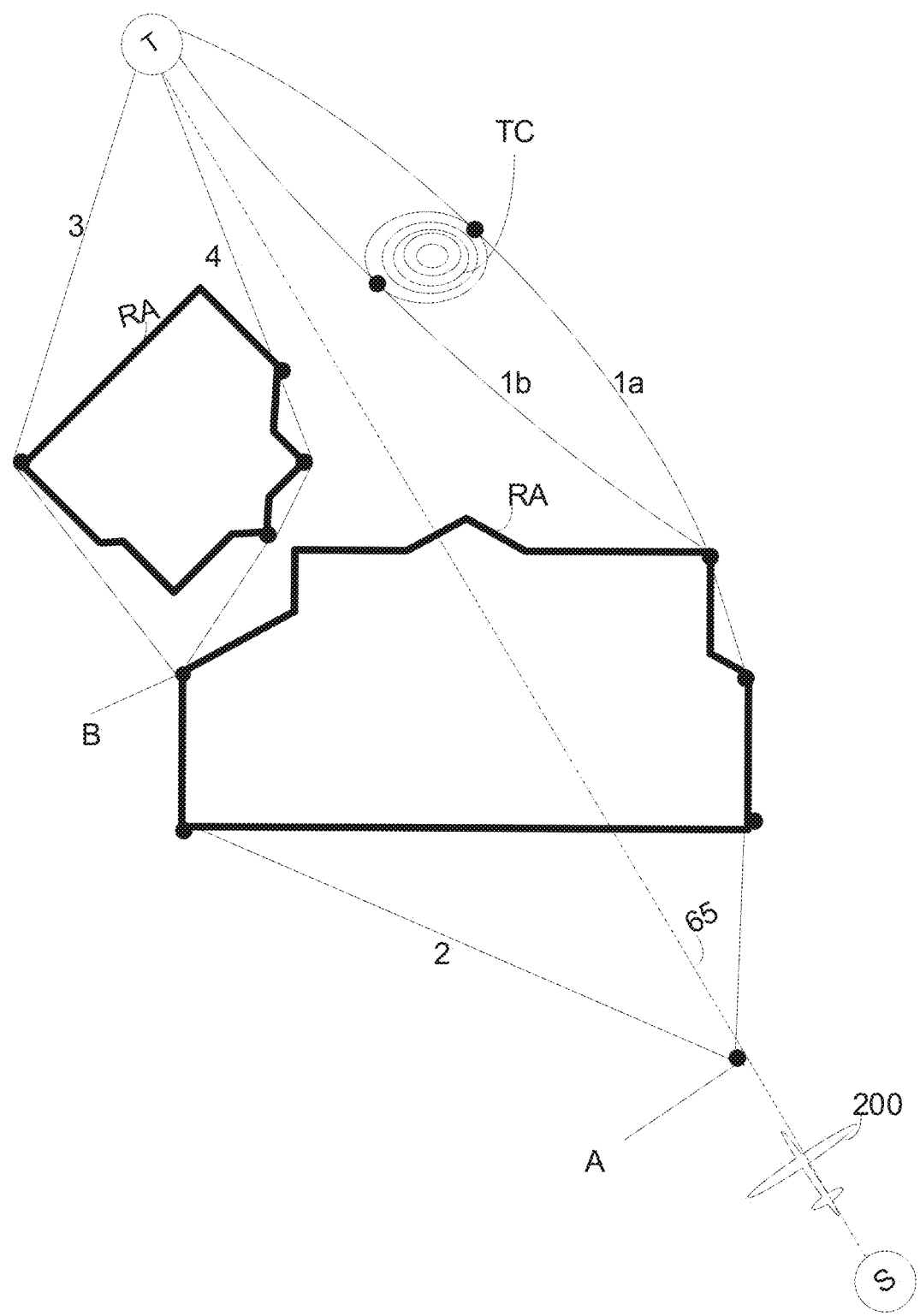
FIG. 5c is another schematic illustration of a flight path generation demonstrating some principles according to examples of the presently disclosed subject matter.

FIG. 3 is flowchart showing an example of a sequence of operations carried out in a situation where an unexpected landing is required. While operations in FIG. 3 are described with reference to elements in FIG. 1 and FIG. 2, this is done by way of example only and should not be construed as limiting in any way. FIGS. 5a, 5b and 5c which are also mentioned herein below, are schematic illustrations which demonstrate some examples related to the autonomous flight path generation process disclosed herein.

As explained above, an unexpected need to autonomously generate a flight path landing may arise during flight. In some example, instructions to execute an autonomous flight path generation process is provided by flight computer 101 to navigation computer 103, in response to data indicating such a need. For example, upon detection of a need for an unexpected landing, an autonomous flight path generation process may be initiated as part of an autonomous descending and landing procedure (e.g. in response to identification of a technical failure such as generator or engine breakdown).

At block 301 a destination of the aircraft is determined. In some examples the destination can be a predefined location. For instance, the aircraft can be pre-programmed to fly to a certain location in the event of failure to communicate with the control unit. Thus, upon detection of communication loss with the control unit (e.g. ground control system (GCS)), the UAV can autonomously initiate a flight path generation process.

In other examples, determining a destination includes selecting a preferred landing site for landing the aircraft e.g. in response to an unexpected need to land the aircraft. A preferred landing site can be selected using various principles and/or methods for selecting a landing site, some of which are known per se. For example, a landing site can be selected from a database storing information with respect to different alternative landing sites located in the vicinity of the aircraft.

Selection of a landing site can be done by a computer or by a human operator. Autonomous selection of a landing site can be executed by an onboard computer configured to select a landing site from a one or more available landing sites stored in a database. In some examples, the onboard subsystem is configured to identify (e.g. by visual analysis of the ground below the aircraft) and classify landing sites located on the ground in the vicinity of the aircraft. Optionally, if the aircraft is a piloted aircraft, the landing site can be selected by the pilot. If uplink communication between a control station and the aircraft is operative, information indicative of a selected landing site can be provided from the control station otherwise the entire process is executed autonomously.

The landing site can be selected based on various parameters, including, for example, the distance between the current position of the aircraft and the landing site, the estimated glide distance of the aircraft, the residual energy resources (e.g. fuel and battery), the wind conditions (e.g. selecting a landing site with a runway which is approachable at a desired angle with respect to wind direction), etc. As mentioned above, system 110 can include a landing site determination module configured for executing processing related to selection of a landing site.

Once a destination is determined, a flight path leading the aircraft from its current position to the destination (e.g. landing site) is generated. In case more than one candidate landing site is available, a preferred landing site can be selected also based on the flight paths that lead the UAV to each candidate landing site. Thus, in some examples the process of selecting a flight path is repeated for a plurality of candidate landing sites and the preferred landing site is selected from among the candidate landing sites, as the one that is reached by a preferred respective flight path (e.g. a flight path that is assigned with the best score).

In some cases, the flight path leads the aircraft from its current position to a landing approach path terminating with a landing window. The position of the landing window is determined at a certain height and position with respect to the selected landing site. Given the position of the landing window and the aircraft's situation data, the aircraft can autonomously and safely land at the landing site (e.g. with the help of autonomous landing control module operatively connected to flight computer 101). The aircraft can be configured to autonomously generate a final landing approach path after generating the flight path and identifying the landing window.

According to examples of the presently disclosed subject matter, the flight path is generated while taking into consideration flight constraints including 2D constraints, 3D constraints and topographical flight constraints. As mentioned above, operations related to the actual generation of the flight path can be performed in some examples by flight path generator circuitry and, more specifically in some examples, by flight path calculator.

Given the current position of the UAV and the position of the target destination (e.g. the location of the landing site, and in some examples, the estimated location of a landing window), an initial flight path leading the UAV from its current position to the target destination, is determined. The initial flight path can be determined based on the general direction heading towards the landing site (block 303). In some examples the initial flight path can be defined as a substantially straight line connecting the current position of the UAV with the target destination.

The initial flight path is analyzed together with mapping data and flight constraints data to determine whether the flight path crosses a restricted area, which is an area that is characterized by some type of flight restriction e.g. an area characterized by a 2D or a 3D flight constraint (block 305). In general, a restricted area can be defined on a map of the traversed area by a line marking its boundaries and may be characterized by a restricted altitude range. The line can be a closed line (e.g. defining a polygon or a circle) or an open line (e.g. indicating a border).

If the entire initial flight path, from start to end, does not cross any restricted area, the initial flight path can be used by the UAV 'as is', without changes. In some examples, it is further determined whether the flight path does not violate a topographical restriction, as further explained below with reference to block 311.

If, on the other hand, the flight path crosses a restricted area, it is next determined whether the restricted area obstructs the flight of the UAV along the flight path (block 307). In order to determine whether a restricted area obstructs the flight, the altitude restrictions characterizing the restricted area are compared to the predicted altitude range of the UAV at the time of crossing the restricted area, and it is determined whether the UAV, when flying along the flight path over the restricted area, will cross the restricted area at an altitude that is within the restricted altitude range.

Attention is now drawn to FIG. 4 which is a flowchart showing an example of operations carried out when determining whether a restricted area obstructs a flight path according to blocks 307 and 309.

At block 401 it is determined whether or not the entire airspace over the restricted area is prohibited for flight. If the answer is affirmative, one or more horizontal alternative sections that bypass the restricted area from one or more (e.g. one from the right, and one from the left) sides, are calculated (block 403).

Otherwise, if the planned flight path crosses a restricted area that contains certain altitudes which are not restricted for flight, it is determined whether the predicted altitude range of the UAV, when reaching the restricted area, conflicts with the restricted altitudes (block 405).

To this end, the predicted altitude of the aircraft when crossing the restricted are is calculated. Calculation of the predicted altitude of the UAV along the flight path can be executed based on the initial altitude of the UAV (e.g. its altitude at the time the need for an emergency landing is detected, which is the starting point of the flight path), and its glide ratio. Other factors that may be considered in the calculation include wind velocity (including real-time changes in wind velocity) and the mechanical condition of the aircraft. As mentioned above in some examples, the predicted altitude is determined by gliding predictor module in flight path generation circuitry 10.

If the answer is no, the flight instructions according to the initial flight path can be maintained (the process reverts to block 305). Otherwise, if a conflict is found between the predicted altitude of the aircraft when crossing the restricted area, and the restricted altitude at the restricted area, the altitude of the flight path along the restricted area can be adjusted to match the permitted altitude. Depending on the specific restricted altitudes, one or more alternative vertical sections leading the aircraft above and/or below the restricted area, are determined (block 407). According to some examples, alternative horizontal sections are also determined in addition to the alternative vertical sections, and a preferred section is selected as further described below.

According to another example, when calculating alternative vertical sections, the ability of the aircraft to make vertical maneuvers for adapting its altitude (herein "vertical maneuverability") is considered. For example, given an alternative vertical section calculated for circumventing a restricted altitude, it is determined whether there are limitations on the vertical maneuverability of the aircraft that incapacitate the aircraft from flying along the alternative vertical sections.

Such limitations can result, for example, from certain predefined operational limitations, or from the specific mechanical conditions of the aircraft. For instance, the aircraft may be incapable, or may not be allowed to make a vertical maneuver that requires a pitch angle greater than a certain value. Alternatively, a specific mechanical failure may prescribe a specific limitation on the ability of the aircraft to control its altitude, and particularly on the ability to increase its altitude. For example, in case of an engine failure, the UAV may have a very limited ability to increase its altitude, while in the case of battery depletion (e.g. generator failure), careful management of the remaining power may be required to ensure safe arrival and landing at the landing site, and therefore the aircraft may be unable, or not allowed to, increase its altitude.

Accordingly, as part of the process of generating alternative vertical sections, it is determined whether the aircraft is capable of executing an alternative vertical section, and if not, the vertical section is discarded. In such cases, other alternative sections are used instead e.g. a different vertical section, or horizontal alternative sections, that do not require the same altitude change. In some cases this includes calculation of the remaining amount of resources (e.g. fuel, electric power), the estimated amount of resources required for safely reaching the destination, and the amount of resources that are required for executing the alternative section. As mentioned further below, in some examples an alternative section is assigned with a respective weight that is based also on the resource consumption.

According to some examples, analysis of the flight constraints along the flight path is made using a data-structure such as a graph or tree-like data structure (referred to herein in general as a "decision tree"). Each point along the flight path where circumvention of a restricted area is required, is set as a branching point e.g. a node in a tree, and each one of the alternative sections branching from that point is set as a vertex in the tree.

The operations related to the analysis of the flight path (blocks 305, 307 and 309) are repeated for each candidate flight path. Each candidate flight path comprises one or more previous sections leading up to the branching point, and one of the alternative sections branching from a branching point. For example, FIG. 5*b* illustrates two branching points (denoted as 'A' and 'B') where a first candidate flight path comprises section 1 branching from branching point A to the right and proceeding all the way to point T; a second candidate flight path comprises section 2 and section 3; and a third candidate flight path comprises section 2 and section 4.

According to some examples, the data structure (e.g. tree or graph) is generated using a recursive process, where the process is executed recursively for each candidate flight path. Once analysis of the flight path is completed, the data structure is traversed backwards in order to calculate the preferred flight path.

In some cases, certain flight paths can be discarded before reaching the destination. For example, in case a flight path includes an alternative vertical section that causes the UAV to crash into the ground before reaching the destination point, that flight path can be discarded, and the process proceeds with the processing of other candidate flight paths. This helps to reduce consumption of processing resources and thus provides a faster and more efficient process.

A further example of a flight constraint is topography restrictions, where the UAV flight path is restricted by the topography. In order to avoid the violation of topographical flight constraints, circuitry 10 is configured to use information regarding the position of the UAV and the position of topographical obstacles in the area. According to some examples, the traversed area is divided into cells of a predefined size, each cell being classified as a restricted area or not (i.e. traversable or non-traversable) according to the topography of the land located therein. For instance, a cell can be defined as a restricted area or not, based on the altitude and area of the highest point of the topography located within the cell. The size of the cells dividing the traversed area can range, for example, between 0.1 square kilometers and 100 square kilometers.

According to some examples, topographical flight constraints are classified as 2D and or 3D flight constraints, based on their area and altitude. Topographical constraints can thus be considered as part of the analysis described above with reference to blocks 305, 307 and 309.

According to other examples, topographical flight restrictions are analyzed separately after analysis of the other constraints has been completed. This may provide a more efficient process where topographical constraints are significantly more abundant than other constraints in the traversed area.

According to this approach, once the processing of a candidate flight path according to blocks 305, 307 and 309 is completed, the resulting candidate flight path undergoes further processing in order to determine whether it crosses non-traversable cells (block 311). In case a non-traversable cell is identified along the flight path, a new branching point is set, and one or more alternative horizontal and/or vertical sections circumventing the non-traversable cell are generated (block 313).

As explained above with respect to block 309, in some examples the operations related to the identification of non-traversable cells are repeated for each section branching from a branching point along a candidate flight path. During this process, the data-structure (e.g. tree or graph) can be recursively traversed in the opposite direction. The example in FIG. 5b shows two branching points, A and B, that create 4 alternative sections, each branching point created before a respective restricted area. According to one example, once the target destination T is reached per the operations related to block 309, the process returns to the last branching point e.g. branching point B, and each one of sections 3 and 4 are analyzed for topographic constraints, and if such constraints are found, one or more alternative sections circumventing the topographical constrains and extending from the branching point B, to point T, are generated. The process continues to analyze sections 2 and 1 in a similar manner. This is exemplified in FIG. 5c which shows the processing of topographical constraints that follows the 2D and 3D analysis illustrated in FIG. 5b. As shown, a topographical constraint TC is identified along section 1 resulting in the branching of two additional alternative sections 1a and 1b and thus the generation of two additional candidate flight paths (referred to herein as "additional candidate flight paths" to differentiate from the term "candidate flight paths" are generated, where a restricted area that is not a topographical restriction is circumvented), one comprising section 1a and the other comprising section 1b.

Once the target destination has been reached, the data structure storing the alternative sections is processed, and a final flight path is selected. As mentioned above, according to one non-limiting example, the data structure (tree or graph) is generated using a recursive process and once analysis of the entire flight path is completed, the data structure is traversed (e.g. in a recursive manner) in order to calculate the preferred flight path.

As explained further below, a final flight path can be selected based on the overall score of each of the different candidate flight paths (313). If topographical constraints are calculated separately and additional candidate flight paths are generated in response to identification of non-traversable cells, the final flight path can be selected based on the overall score of each of the different candidate flight paths and additional candidate flight paths.

According to some examples, a respective weight is assigned to each alternative section. The respective weight is calculated based on one or more cost parameters. Cost parameters can be used as input to a cost function for calculating the respective weight. Cost parameters can include, for example, the length of the alternative section, altitude change (elevation or drop) along the alternative section, estimated resource consumption (e.g. fuel or energy) along the alternative section, whether the alternative sections pass through allowed but undesired areas, etc. The cost function is used for compiling the different cost parameters and selecting a preferred flight path from the optional candidate flight paths. The preferred flight path is a flight path that can be executed given any limitations of the UAV, technical or other, and which enables the UAV to reach the target destination. The cost function can also be used for optimizing (e.g. minimizing) resource consumption and time. The values of each cost parameter may also depend on the specific mechanical condition of the UAV. For example, in case the UAV suffers from fuel shortage, the estimated fuel consumption may have a greater impact on the calculated weight than in other cases where fuel is ample.

A total score can be calculated (e.g. using the cost function) for each of a plurality of different candidate flight paths, each candidate flight path being constructed from a specific combination of alternative sections and the remaining parts of the initial flight path that lead the aircraft to the target destination, without (or as little as possible) violation of the flight constraints. The calculation and assignment of weights for each alternative section can be done as part of the analysis process as described above, e.g. following the generation of each alternative section as described with reference to block 309 and 313, a respective weight can be calculated and assigned to each alternative section. Alternatively, calculation and assignment of weights can be done as part of a separate process where the data structure (e.g. tree or graph) is traversed for that purpose.

As shown in FIG. 5a, as the processing of the flight path continues, different alternative sections may converge back together and meet at a mutual point, e.g. along the initial flight path. As further shown in FIG. 5b, if additional restricted areas are identified and further branching points are determined (branching point B), additional alternative sections may be added to the decision tree. In order to reduce consumption of processing resources (including processing power, computer memory, and processing time), at least some of the information can be discarded immediately after calculation. For example, if two sections branching from one branching point converge at a point located further on the flight path, one section can be selected in real-time before processing of the entire path is completed, while the other is discarded. Thus, according to one example, the process of screening alternative sections is not limited to the end of the analysis process, but also occurs during the analysis process.

In some examples, in order to minimize the length of the final flight path, the process strives to keep the alternative sections as close as possible to the restricted area. Thus, as shown in FIG. 5b, in case the restricted area has a polygon shape, the alternative sections are extended along the vertexes of the polygon. As further shown in FIG. 5a, in case the restricted area is characterized by curved sides, the alternative sections are extended along the vertexes of a circumgon (a polygon tangential to the restricted area).

Once processing of the entire initial flight path is completed and a final flight path is selected, the final flight path is then used by the navigation computer for navigating the UAV along the route towards the destination. For example, flight control unit can generate instructions to the flight devices for directing the UAV along the flight path.

Once the landing site is reached, the UAV can autonomously land at the landing site. According to some examples, the flight computer can comprise an autonomous landing control unit, configured and operable to control the UAV during the autonomous landing procedure which is executed upon arrival to the landing site (e.g. starting from a window). Autonomous landing control module is configured to generate instructions to various UAV systems such as, flaps, rudder, wheels etc. in order to land the aircraft safely.

The invention claimed is:

1. A method of autonomous flight path generation and control over an aircraft while traversing an area, the method comprising:
while the aircraft is flying in midair, in response to a need to unexpectedly land the aircraft due to a mechanical failure, calculating a flight path from a current position of the aircraft to a target position of the aircraft located near a landing site, the calculation comprising:

determining an initial flight path leading from a current position to the target position;

determining vertical maneuverability of the aircraft according to the mechanical failure;

processing of the initial flight path, the processing comprising:

A. determining whether there is one or more restricted areas located along the flight path;

for each restricted area:

calculating a respective predicted altitude range of the aircraft when traversing the restricted area based on data including a glide ratio of the aircraft;

determining whether there is a conflict between an altitude restriction characterizing the restricted area and the predicted altitude range;

and should such conflict exist, determining one or more alternative sections circumventing the restricted area; and generating one or more candidate flight paths, each comprising an alternative section, together with one or more previous sections leading to the alternative section; wherein in case the vertical maneuverability allows the aircraft to vertically circumvent the restricted area, the one or more alternative sections comprises at least one vertical alternative section;

dividing the traverse area into cells;

processing each candidate flight path, comprising:

B. for each cell along the candidate flight path:

determining whether there is a conflict between an altitude restriction characterizing the cell and a predicted altitude range of the aircraft when traversing the cell; the predicted altitude range of the aircraft when traversing the cell is calculated based on data including the glide ratio of the aircraft;

and should such conflict exist, determining one or more alternative sections circumventing the cell; and generating one or more additional candidate flight paths, each comprising an alternative section, together with one or more previous sections leading to the alternative section; wherein in case the vertical maneuverability allows the aircraft to vertically circumvent the cell, the one or more alternative sections comprises at least one vertical alternative section;

selecting a preferred flight path from among the candidate flight paths and the additional candidate flight paths; and generating instructions to aerial control devices for guiding the aircraft along the preferred flight path.

2. The method of claim 1 further comprising:

determining whether an entire airspace in the restricted area is prohibited for flight, and if so, determining one or more horizontal alternative sections circumventing the restricted area.

3. The method of claim 1, wherein the one or more alternative sections comprise one or more alternative horizontal sections for circumventing the restricted area from one or both sides.

4. The method of claim 1, wherein process (A) further comprises: assigning a respective weight to each one of the one or more alternative sections; the respective weight representing one or more cost parameters;

wherein the preferred flight path which is selected comprises one or more alternative sections and is characterized by an acceptable overall cost value calculated based on the respective weights assigned to the one or more alternative sections.

5. The method of claim 1, wherein the aircraft is a UAV.

6. The method of claim 1, further comprising:

determining a landing site, wherein the target position is located near the landing site.

7. The method of claim 6 further comprising:

identifying at least two potential landing sites;

determining two or more initial flight paths, each leading from a current position of the aircraft to a target position determined according to a respective landing site;

performing process (A) for each initial flight path to thereby obtain a plurality of preferred flight paths, each leading to a respective landing site; and selecting a final flight path and a respective landing site from among the plurality of preferred flight paths.

8. A system mountable on an aircraft for enabling autonomous flight path generation and control over aircraft; the system comprising a processing circuitry configured to:

in response to data indicative of a need to unexpectedly land the aircraft due to a mechanical failure, to calculate a flight path from a current position of the aircraft to a target position of the aircraft located near a landing site, the calculation comprising:

determining an initial flight path leading from a current position to the target position;

determining vertical maneuverability of the aircraft according to the mechanical failure;

processing of the initial flight path, the processing comprising:

A. determining whether there is one or more restricted areas located along the flight path;

for each restricted area:

calculating a respective predicted altitude range of the aircraft when traversing the restricted area based on data including a glide ratio of the aircraft;

determining whether there is a conflict between an altitude restriction characterizing the restricted area and the predicted altitude range;

and should such conflict exist, determining one or more alternative sections circumventing the restricted area; and generating one or more candidate flight paths, each comprising an alternative section, together with one or more previous sections leading to the alternative section; wherein in case the vertical maneuverability allows the aircraft to vertically circumvent the restricted area, the one or more alternative sections comprises at least one vertical alternative section;

dividing the traverse area into cells;

processing each candidate flight path, comprising:

B. for each cell along the candidate flight path:

determining whether there is a conflict between an altitude restriction characterizing the cell and a predicted altitude range of the aircraft when traversing the cell; the predicted altitude range of the aircraft when traversing the cell is calculated based on data including the glide ratio of the aircraft, and should such conflict exist, determining one or more alternative sections circumventing the cell; and generating one or more additional candidate flight paths, each comprising an alternative section, together with one or more previous sections leading to the alternative section; wherein in case the vertical maneuverability allows the aircraft to vertically circumvent the cell, the one or more alternative sections comprises at least one vertical alternative section;

selecting a preferred flight path from among the candidate flight paths and the additional candidate flight paths; and generating instructions to aerial control devices for guiding the aircraft along the preferred flight path.

9. The system of claim 8, wherein the processing circuitry is further configured to determine whether an entire airspace in the restricted area is prohibited for flight, and if so, determine one or more horizontal alternative sections circumventing the restricted area.

10. The system of claim 8, wherein the one or more alternative sections comprise one or more alternative horizontal sections for circumventing the restricted area from one or both sides.

11. The system of claim 8, wherein the processing circuitry is further configured to assign a respective weight to each one of the one or more alternative sections; the respective weight representing one or more cost parameters;

wherein the preferred flight path which is selected comprises one or more alternative sections and is characterized by an acceptable overall cost value calculated based on the respective weights assigned to the one or more alternative sections.

12. The system of claim 8, the processing circuitry is further configured to:

determine a landing site, wherein the target position is located near the landing site.

13. The system of claim 12, wherein the processing circuitry is further configured to identify at least two potential landing sites;

determine two or more initial flight paths, each leading from a current position of the aircraft to a target position determined according to a respective landing site;

perform process (A) for each initial flight path to thereby obtain a plurality of preferred flight paths, each leading to a respective landing site;

selecting a final flight path and a respective landing site from among the plurality of preferred flight paths.

14. A computer-readable non-transitory memory device tangibly embodying a program of instructions executable by the computer for executing a method of autonomous flight path generation and control over an aircraft while traversing an area, the method comprising:

while the aircraft is flying in midair, in response to a need to unexpectedly land the aircraft due to a mechanical failure, calculating a flight path from a current position of the aircraft to a target position of the aircraft located near a landing site, the calculation comprising:

determining an initial flight path leading from a current position to the target position;

determining vertical maneuverability of the aircraft according to the mechanical failure;

processing of the initial flight path, the processing comprising:

A. determining whether there is one or more restricted areas located along the flight path;

for each restricted area:

calculating a respective predicted altitude range of the aircraft when traversing the restricted area based on data including a glide ratio of the aircraft;

determining whether there is a conflict between an altitude restriction characterizing the restricted area and the predicted altitude range;

and should such conflict exist, determining one or more alternative sections circumventing the restricted area; and generating one or more candidate flight paths, each comprising an alternative section, together with one or more previous sections leading to the alternative section; wherein in case the vertical maneuverability allows the aircraft to vertically circumvent the restricted area, the one or more alternative sections comprises at least one vertical alternative section;

dividing the traverse area into cells;

processing each candidate flight path, comprising:

B. for each cell along the candidate flight path:

determining whether there is a conflict between an altitude restriction characterizing the cell and a predicted altitude range of the aircraft when traversing the cell; the predicted altitude range of the aircraft when traversing the cell is calculated based on data including the glide ratio of the aircraft;

and should such conflict exist, determining one or more alternative sections circumventing the cell; and generating one or more additional candidate flight paths, each comprising an alternative section, together with one or more previous sections leading to the alternative section; wherein in case the vertical maneuverability allows the aircraft to vertically circumvent the cell, the one or more alternative sections comprises at least one vertical alternative section;

selecting a preferred flight path from among the candidate flight paths and the additional candidate flight paths; and generating instructions to aerial control devices for guiding the aircraft along the preferred flight path.

* * * * *